United States Patent
Chakra et al.

(10) Patent No.: US 9,858,335 B2
(45) Date of Patent: Jan. 2, 2018

(54) PROVIDING SEARCHING STRATEGY IN CONNECTION WITH ANSWERING QUESTION IN MESSAGE

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 14/692,431

(22) Filed: Apr. 21, 2015

(65) Prior Publication Data

US 2016/0314197 A1  Oct. 27, 2016

(51) Int. Cl.
*G06F 17/30* (2006.01)
*H04L 12/58* (2006.01)

(52) U.S. Cl.
CPC .. *G06F 17/30684* (2013.01); *G06F 17/30654* (2013.01); *G06F 17/30696* (2013.01); *H04L 51/02* (2013.01); *H04L 51/08* (2013.01)

(58) Field of Classification Search
CPC ............... G06F 17/30867; G06F 17/30; G06F 17/30017; G06F 11/3438; G06F 2201/86; G06F 17/30684; G06F 11/3414; G06F 11/3476; G06F 2201/875; G06F 9/4446; G06N 5/02; G09B 7/02; G09B 5/00; G09B 5/06; H04L 67/22
USPC ............. 707/722, 769; 706/46, 50; 715/704; 434/350
See application file for complete search history.

(56) References Cited

U.S. PATENT DOCUMENTS

| 7,725,526 | B1 | 5/2010 | Kraft |
| 8,489,588 | B2 | 7/2013 | Figueroa et al. |
| 8,745,492 | B2 * | 6/2014 | Karn ................... G06F 11/3414 715/704 |

(Continued)

FOREIGN PATENT DOCUMENTS

WO   2008031871 A1   3/2008

OTHER PUBLICATIONS

Anton N. Dragunov et al.; "TaskTracer: A Desktop Environment to Support Multi-tasking Knowledge Workers";ACM; Jan. 9-12, 2005.*

*Primary Examiner* — Dennis Truong
(74) *Attorney, Agent, or Firm* — Robert A. Voigt, Jr.; Winstead, P.C.

(57) ABSTRACT

A method, system and computer program product for providing a searching strategy in connection with answering a question in a message. A message containing a question is detected as being received from a sender. The steps performed by the recipient of the message to answer the question are monitored. Content is detected as being inserted in a reply message responding to the sender's message via a copy and paste operation. In response to detecting the copy and paste operation, the monitored steps utilized by the user in the user's searching strategy in arriving at an answer to the sender's question are stored in a database. The monitored steps are then attached to the reply message as tags or a link to the database to retrieve the stored monitored steps is inserted in the reply message thereby allowing the sender to replay the searching strategy used in answering the sender's question.

20 Claims, 5 Drawing Sheets

(56) References Cited

U.S. PATENT DOCUMENTS

| | | | |
|---|---|---|---|
| 8,832,055 B1* | 9/2014 | Zwicky | G06Q 30/02 707/706 |
| 9,047,464 B2* | 6/2015 | Sambamurthy | G06F 21/55 |
| 2004/0143630 A1* | 7/2004 | Kaufmann | G09B 7/02 709/205 |
| 2006/0218034 A1* | 9/2006 | Kelly | G06F 11/3476 434/350 |
| 2008/0263009 A1 | 10/2008 | Buettner et al. | |
| 2011/0208727 A1* | 8/2011 | Jones | G06F 17/30867 707/723 |
| 2011/0276396 A1* | 11/2011 | Rathod | G06F 17/30867 705/14.49 |
| 2012/0041950 A1* | 2/2012 | Koll | G09B 7/02 707/728 |
| 2013/0073646 A1 | 3/2013 | Appelman et al. | |
| 2014/0040243 A1 | 2/2014 | Rubinstein et al. | |
| 2014/0149330 A1* | 5/2014 | Kaplan | G06N 5/022 706/46 |
| 2014/0195525 A1 | 7/2014 | English et al. | |
| 2014/0310596 A1* | 10/2014 | Lafreniere | G06F 3/0481 715/708 |
| 2014/0324757 A1* | 10/2014 | Tabrizi | G06F 17/30 706/50 |
| 2014/0358890 A1* | 12/2014 | Chen | G06F 17/30654 707/710 |

* cited by examiner

PROVIDING SEARCHING STRATEGY IN CONNECTION WITH ANSWERING QUESTION IN MESSAGE

TECHNICAL FIELD

The present invention relates generally to communications, and more particularly to providing the searching strategy in connection with answering a question in a message (e.g., instant message, e-mail, social media post).

BACKGROUND

There are various forms of communication between users of a computing device, such as via electronic mail ("e-mail"), text messaging, etc. Oftentimes, a sender of such a message may ask a question in the message that is sent to the recipient. For example, the sender may ask the question of "What is J2EE®?" in the message. The recipient of the message may engage in a search, such as on Google's® website, to find a good definition of J2EE® for the sender. The recipient may consult various repositories (e.g., W3Schools®, Oracle® Academy—Java®, a departmental learning database) as well as ignore other repositories (e.g., Java Community Process® Program, J2EE® models discussed on the open source community of Eclipse®). The recipient of the message may then extract some of the information learned from these repositories into a response (reply message) to the sender of the original message.

While the information provided in the reply message is helpful for the sender in terms of answering the sender's question, the sender of the original message may desire to know the search strategy in deriving the answer. Such a search methodology may be utilized to answer similar questions, such as those involving a similar topic. For example, the sender of the original message may also desire to know what "Java® EE Bean Validation" means. If the sender had knowledge of the searching strategy used to answer the question regarding the meaning of J2EE®, then the sender may be able to learn what "Java® EE Bean Validation" means from the recipient's searching methodology.

Currently, the sender only obtains knowledge of the searching strategy by having the recipient of the message verbally explain his/her thought process in reaching an answer to the sender's question. Such a process is inefficient and time consuming.

BRIEF SUMMARY

In one embodiment of the present invention, a method for providing a searching strategy in connection with answering a question in a message comprises detecting a message being received from a sender containing a question. The method further comprises monitoring steps performed by a recipient of the message to answer the question. The method additionally comprises storing the monitored steps in a database. Furthermore, the method comprises detecting content answering the question being inserted in a reply message responding to the message. Additionally, the method comprises attaching, by a processor, the stored monitored steps to the reply message as tags or inserting a link to the database in the reply message to retrieve the stored monitored steps thereby allowing the sender to replay a searching strategy used to answer the question. In addition, the method comprises sending the reply message with the tagged monitored steps or the link to the database to retrieve the stored monitored steps to the sender.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for providing a searching strategy in connection with answering a question in a message. In one embodiment of the present invention, a message containing a question is detected as being received from a sender. The steps performed by the recipient of the message to answer the question are monitored. "Monitoring," as used herein, refers to capturing the steps performed by the user (i.e., the recipient of the message), such as online activity, that were used by the user to provide an answer to the question posed to the user. Such steps may involve search terms and selections of uniform resource locators. Content is detected as being inserted in a reply message responding to the sender's message via a copy and paste operation. In response to detecting the copy and paste operation, the monitored steps utilized by the user in the user's searching strategy in arriving at an answer to the sender's question are stored in a database. The monitored steps are then attached to the reply message as tags or a link to the database to retrieve the stored monitored steps is inserted in the reply message thereby allowing the sender to replay the searching strategy used in answering the sender's question. The reply message is then sent to the sender of the original message. In this manner, the sender will have knowledge of the searching strategy used in answering the sender's question in a more efficient manner (as opposed to having the user verbally explain his/her thought process to the sender in reaching an answer to the sender's question) which may be used to answer similar questions, such as those involving a similar topic.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
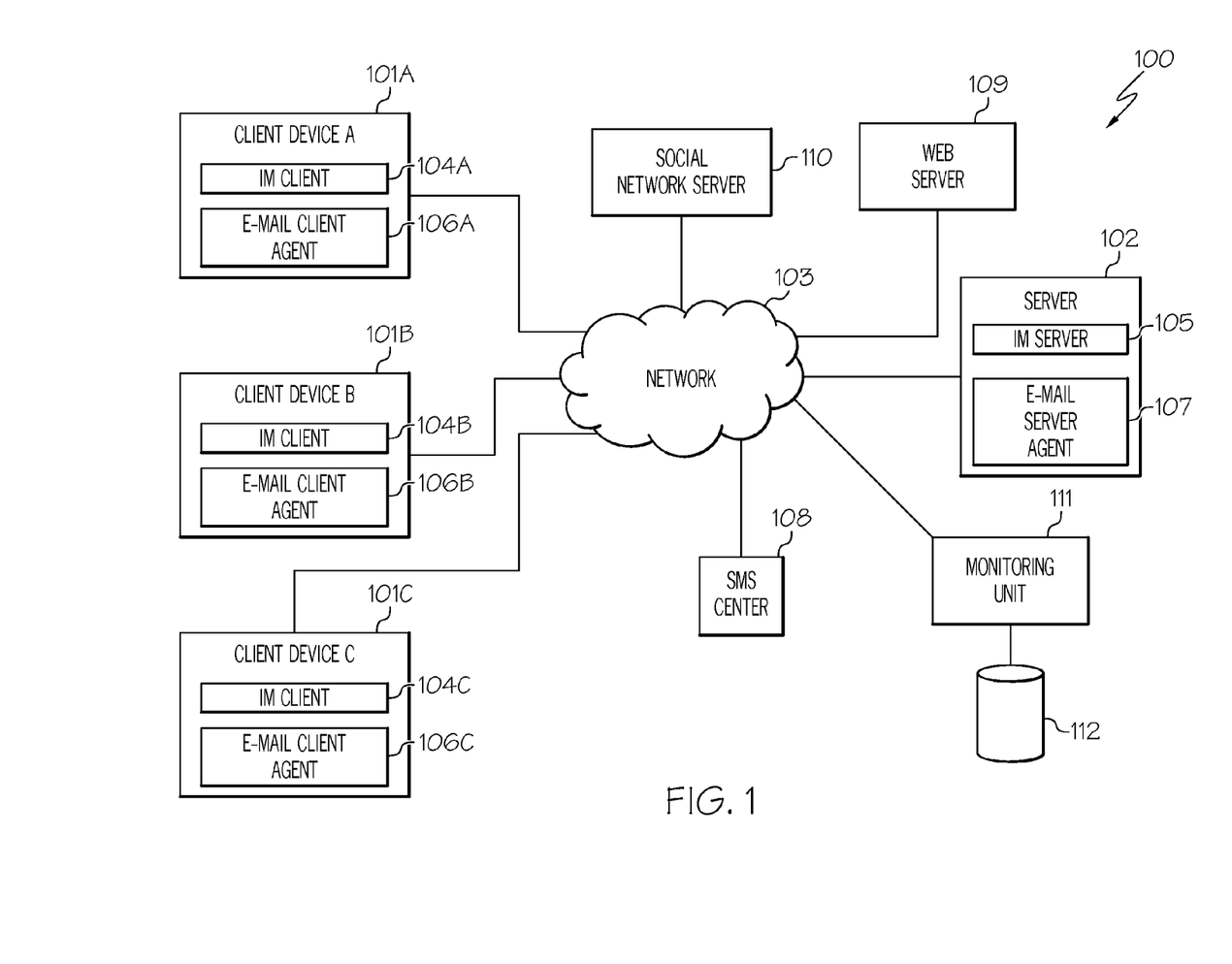
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, any user of client device 101 may be able to create, receive and send e-mails. Additionally, any user of client device 101 may be able to send and receive text messages, such as Short Message Services (SMS) messages. The term "messages," as used herein, encompasses each of these types of messages as well as posts to social media websites, such as Facebook®, forums, wikis, etc.

Network 103 may be, for example, a local area network, a wide area network, a wireless wide area network, a circuit-switched telephone network, a Global System for Mobile Communications (GSM) network, Wireless Application Protocol (WAP) network, a Wi-Fi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for client device 101 to connect to the IM server 105 which provides the functionality of distributing the instant messages to the IM clients 104 associated with each of the sharing users.

Client devices 101A-101C may further include a software agent, referred to herein as an e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of client device 101 to create, send and receive e-mails. E-mail server agent 107 is configured to receive e-mail messages from client devices 101 and distribute the received e-mail messages among the one or more client devices 101.

While the preceding discusses each client device 101 as including an IM client 104 and an e-mail client agent 106, each client device 101 may not necessarily include each of these software agents. For example, some client devices 101 may only include an IM client 104; whereas, other client devices 101 may only include an e-mail client agent 106. In other words, each client device 101 may be able to perform some or all of the functions discussed herein, such as sending/receiving e-mails, sending/receiving instant messages, sending/receiving text messages, etc. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents. For example, one particular server 102 may only include IM server 105; whereas, another particular server 102 may only include e-mail server agent 107.

System 100 further includes a Short Message Service (SMC) center 108 configured to relay, store and forward text messages, such as SMS messages, among client devices 101 through network 103.

System 100 further includes a web server 109 configured to host websites (e.g., www.google.com). Web server 109 is connected to network 103 by wire or wirelessly.

System 100 additionally includes a social network server 110 configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 110 is connected to network 103 by wire or wirelessly. While FIG. 1 illustrates a single social network server 110, it is noted for clarity that multiple servers may be used to implement the social networking and/or microblogging service.

System 100 further includes a component, referred to herein as the "monitoring unit" 111, connected to network 103 by wire or wirelessly. Monitoring unit 111 is configured to monitor a searching strategy utilized by a user (e.g., user of client device 101A) in answering a question posed to the user in a message, where such a searching strategy will become available to the sender of the question as discussed further below in connection with FIGS. 3-5. A description of the hardware configuration of monitoring unit 111 is provided below in connection with FIG. 2.

As further illustrated in FIG. 1, monitoring unit 111 is connected to a database 112 configured to store the steps ("searching strategy") utilized by the user (e.g., user of client device 101A) in answering the question posed to the user in a message as discussed further below in connection with FIGS. 3-5. In one embodiment, the user performing the searching strategy may be able to determine who has the ability to receive the user's searching strategy in connection with answering a question in a message. For example, the user may have a profile which contains a listing of which users, whether identified by name, e-mail address, phone number or relationship (e.g., work colleague), are to have access to the user's searching strategy. In one embodiment, monitoring unit 111 may search the user's profile prior to attaching the monitored steps to a reply message as tags or prior to inserting a link to database 112 to retrieve the stored monitored steps to ensure that the user authorizes the sender to receive the user's searching strategy. For example, the user may have a profile that indicates that work colleagues have access to the user's searching strategy when the user answers a question posed by a user's work colleague. The work colleague may be identified by matching the e-mail address of the sender of the message received by the user with the e-mail address of the work colleague listed in the user's profile. If the user does not specify that this particular sender is a work colleague, monitoring unit 111 may be configured to determine the relationship (e.g., work colleague) of the sender to the user using social media, such as reviewing the connections on the user's LinkedIn® profile.

System 100 is not to be limited in scope to any one particular network architecture. System 100 may include any number of client devices 101, servers 102, networks 103, SMS centers 108, web servers 109, social network servers 110, monitoring units 111 and databases 112. Furthermore, in one embodiment, monitoring unit 111 may be part of client device 101.

Figure 2:
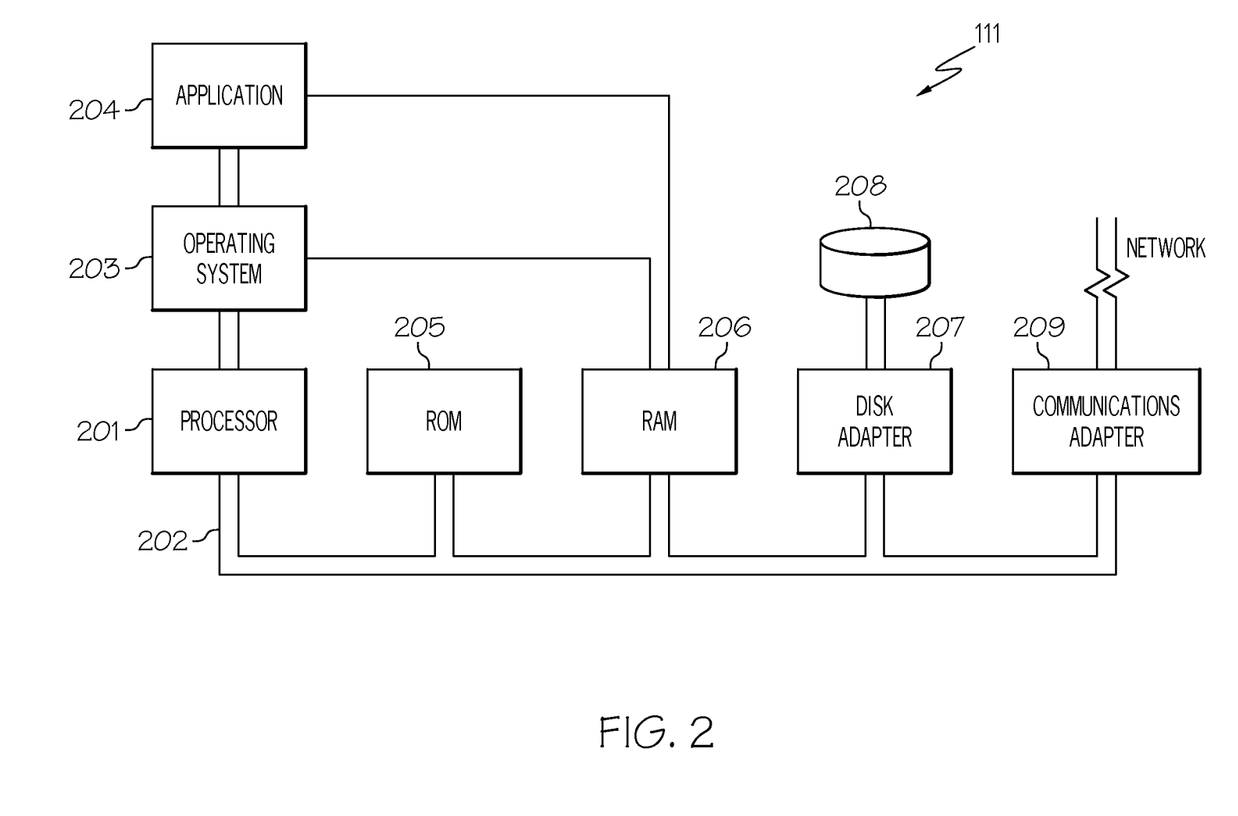
FIG. 2 illustrates a hardware configuration of a monitoring unit in accordance with an embodiment of the present invention.

Referring now to FIG. 2, FIG. 2 illustrates a hardware configuration of monitoring unit 111 (FIG. 1) which is representative of a hardware environment for practicing the present invention. Referring to FIG. 2, monitoring unit 111 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing the searching strategy in arriving at an answer to a question along with the answer to the question in a reply message as discussed further below in connection with FIGS. 3-5.

Referring again to FIG. 2, read-only memory ("ROM") 205 is coupled to system bus 202 and includes a basic input/output system ("BIOS") that controls certain basic functions of monitoring unit 111. Random access memory ("RAM") 206 and disk adapter 207 are also coupled to system bus 202. It should be noted that software components including operating system 203 and application 204 may be loaded into RAM 206, which may be monitoring unit's 111 main memory for execution. Disk adapter 207 may be an integrated drive electronics ("IDE") adapter that communicates with a disk unit 208, e.g., disk drive. It is noted that the program for providing the searching strategy in arriving at an answer to a question along with the answer to the question in a reply message, as discussed further below in connection with FIGS. 3-5, may reside in disk unit 208 or in application 204.

Monitoring unit 111 may further include a communications adapter 209 coupled to bus 202. Communications adapter 209 interconnects bus 202 with an outside network (network 103 of FIG. 1) thereby enabling monitoring unit 111 to communicate with other devices, such as client devices 101, web server 109, social network server 110, etc. of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, oftentimes, a sender of a message may ask a question in the message that is sent to the recipient. For example, the sender may ask the question of "What is J2EE®?" in the message. The recipient of the message may engage in a search, such as on Google's® website, to find a good definition of J2EE® for the sender. The recipient may consult various repositories (e.g., W3Schools®, Oracle® Academy—Java®, a departmental learning database) as well as ignore other repositories (e.g., Java Community Process® Program, J2EE® models discussed on the open source community of Eclipse®). The recipient of the message may then extract some of the information learned from these repositories into a response (reply message) to the sender of the original message. While the information provided in the reply message is helpful for the sender in terms of answering the sender's question, the sender of the original message may desire to know the search strategy in deriving the answer. Such a search methodology may be utilized to answer similar questions, such as those involving a similar topic. For example, the sender of the original message may also desire to know what "Java® EE Bean Validation" means. If the sender had knowledge of the searching strategy used to answer the question regarding the meaning of J2EE®, then the sender may be able to learn what "Java® EE Bean Validation" means from the recipient's searching methodology. Currently, the sender only obtains knowledge of the searching strategy by having the recipient of the message verbally explain his/her thought process in reaching an answer to the sender's question. Such a process is inefficient and time consuming.

The principles of the present invention provide a means for providing the searching strategy in arriving at an answer to a question along with the answer to the question in a reply message as discussed further below in connection with FIGS. 3-5. FIG. 3 is a flowchart of a method for providing the searching strategy in arriving at an answer to a question along with the answer to the question in a reply message. FIG. 4 is a screenshot of some of the steps utilized by the user in the user's searching strategy in arriving at an answer to the question. FIG. 5 illustrates a reply message responding to the question by including an answer to the question as well as a link to a database that contains the steps utilized in the user's searching strategy in arriving at the answer to the question.

Figure 3:
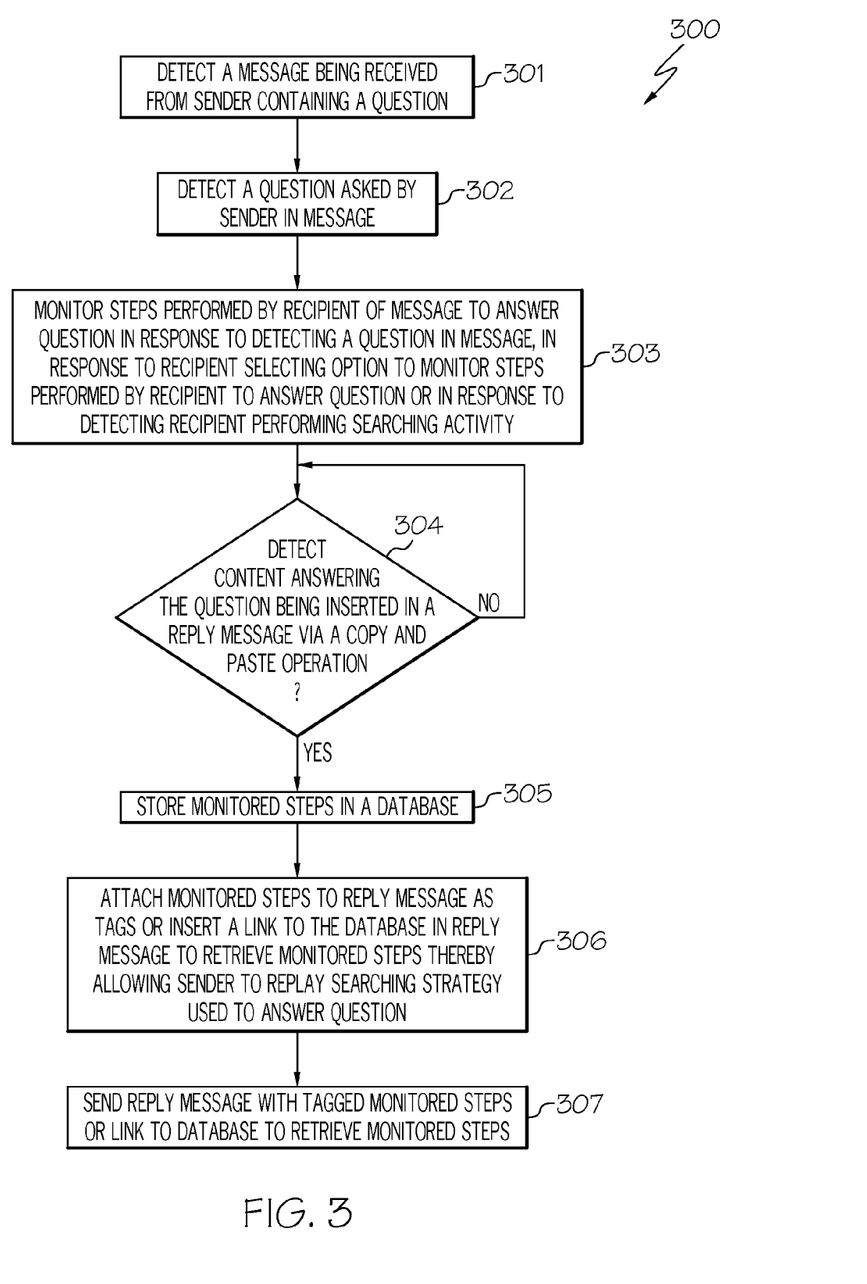
FIG. 3 is a flowchart of a method for providing the searching strategy in arriving at an answer to a question along with the answer to the question in a reply message in accordance with an embodiment of the present invention.

As stated above, FIG. 3 is a flowchart of a method 300 for providing the searching strategy in arriving at an answer to a question along with the answer to the question in a reply message in accordance with an embodiment of the present invention.

Referring to FIG. 3, in conjunction with FIGS. 1-2, in step 301, monitoring unit 111 detects a message (e.g., instant message, e-mail, social media post) being received by a user (e.g., user of client device 101A) from a sender (e.g., user of client device 101B), where the message contains a question. The "sender," as used herein, refers to the author of the message that contains a question to be answer. The "recipient," as used herein, refers to the user who receives the message from the sender containing a question to be answered by the recipient.

In step 302, monitoring unit 111 detects a question in the message. That is, monitoring unit 111 detects a question being asked by the sender (e.g., user of client device 101B) in the message received by the user (e.g., user of client device 101A). In one embodiment, a question may be detected using natural language processing, such as by focusing on keywords (e.g., "what," "why," "how") or punctuation marks (e.g., question mark) in the message that may indicate a question is being asked. For example, monitoring unit 111 may detect the question of "What is Java?" in the message based on the term "what" and the question mark.

In step 303, monitoring unit 111 monitors the steps performed by the recipient of the message to answer the question. "Monitoring," as used herein, refers to capturing the steps performed by the user, such as online activity, that were used by the user to provide an answer to the question posed to the user (i.e., the recipient of the message). Such steps may involve search terms and selections of uniform resource locators. In one embodiment, "monitoring" may involve monitoring the steps used to answer the question performed by the recipient of the message as well as by others forming a group of individuals.

In one embodiment, such monitoring may be implemented in response to detecting a question in the message in step 302. In another embodiment, such monitoring may be implemented by the user (i.e., the recipient of the message) selecting an option to enact monitoring.

In a further embodiment, such monitoring may be implemented in response to detecting the user (i.e., the recipient of the message) performing searching activity, such as performing a search related to the topic of the message on Google's® website. The "topic" refers to the main subject of the message. In one embodiment, the topic of the message may be identified using natural language processing, where keywords (e.g., "travel," "meeting," "birthday party") may be used to identify the topic of the message using natural language processing.

In step 304, a determination is made by monitoring unit 111 as to whether monitoring unit 111 detects content answering the question being inserted in a reply message responding to the sender's message via a copy and paste operation. For example, the content may be obtained from a particular website which was copied and pasted into the message responding to the sender's message.

If monitoring unit 111 did not detect a copy and paste operation, then monitoring unit 111 continues to determine whether content answering the question was inserted into a reply message responding to the sender's message via a copy and paste operation in step 304.

If, however, monitoring unit 111 detected a copy and paste operation, then, in step 305, monitoring unit 111 stores the monitored steps (steps monitored in step 303) in a database 112. For example, referring to FIG. 4, FIG. 4 is a screenshot 400 of some of the steps utilized by the user (e.g., user of client device 101A) in the user's searching strategy in arriving at an answer to the sender's question in accordance with an embodiment of the present invention.

Figure 4:
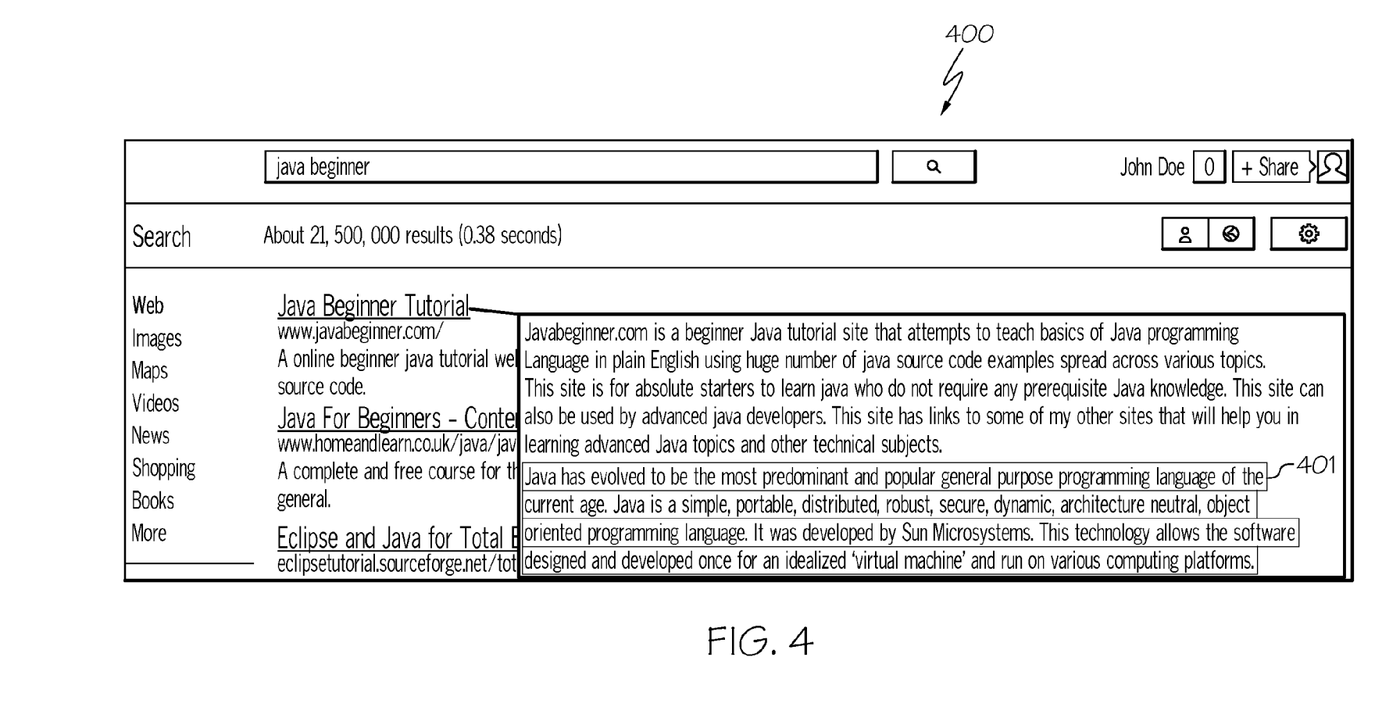
FIG. 4 is a screenshot of some of the steps utilized by the user in the user's searching strategy in arriving at an answer to the question in accordance with an embodiment of the present invention.

As illustrated in FIG. 4, screenshot 400 shows the various sites (e.g., www.javabeginner.com) found by Google® in response to the user's search of "java beginner." Such a search may be in response to the question of "What is Java?" in the message. As further illustrated in FIG. 4, the user opened the search result of "Java Beginner Tutorial" (e.g., 14$^{th}$ search result) and copied a section of text 401 from the website of www.javabeginner.com which contained some language that the user thought was good at answering the sender's question. Such text may be copied into a reply message to the sender as illustrated in FIG. 5.

Figure 5:
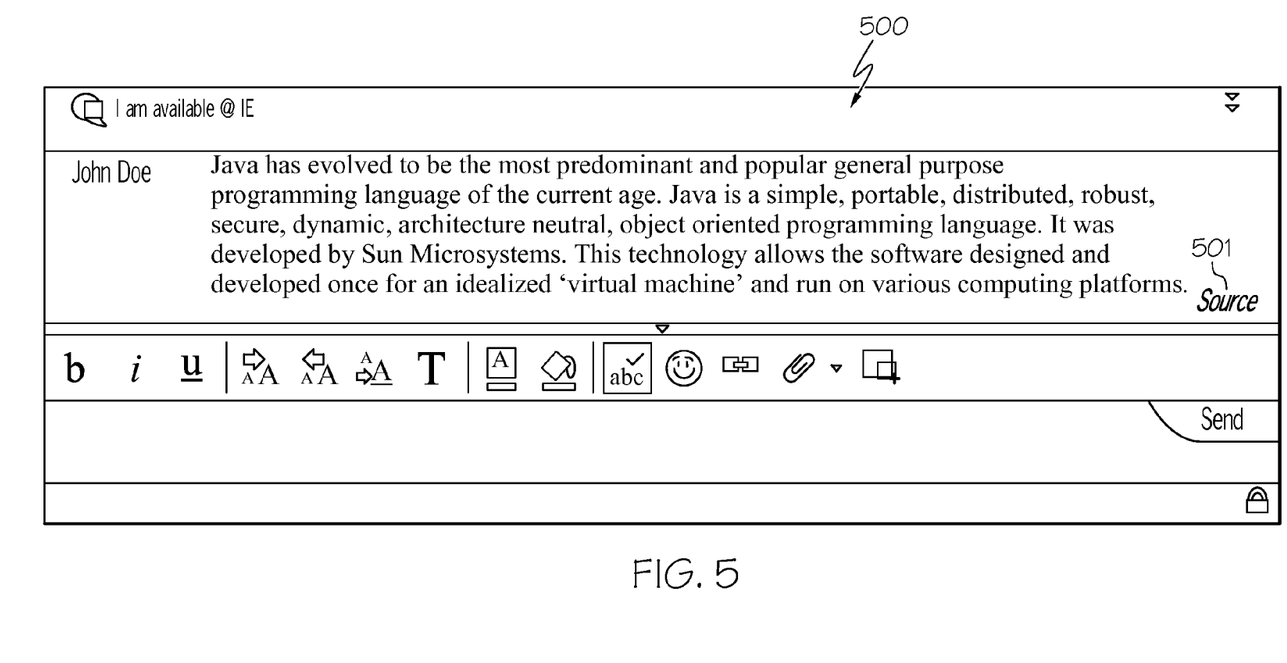
FIG. 5 illustrates a reply message responding to the question by including an answer to the question as well as a link to a database that contains the steps utilized in the user's searching strategy in arriving at the answer to the question in accordance with an embodiment of the present invention.

FIG. 5 illustrates a reply message 500 responding to the question by including an answer to the question as well as a link to a database (e.g., database 112 of FIG. 1) that contains the steps utilized in the user's searching strategy in arriving at the answer to the question in accordance with an embodiment of the present invention.

Referring to FIG. 5, in conjunction with FIGS. 3-4, the user (identified as "John Doe" in FIG. 5) who received the message containing a question responded to the question by inserting (pasting) the text 401 copied from the website of www.javabeginner.com into reply message 500 which answers the question posed to the user.

Returning to FIG. 3, in conjunction with FIGS. 1-2 and 4-5, in step 306, monitoring unit 111 attaches the monitored steps (the steps monitored in step 303) to reply message 500 as tags or inserts a link to a database (e.g., database 112) in reply message 500 to retrieve the stored monitored steps thereby allowing the sender to replay the searching strategy used in answering the sender's question.

For instance, referring to the example above in connection with FIGS. 4 and 5, the searching strategy may include the monitored steps of (1) navigating to www.google.com to perform a search; (2) searching the term "java beginner" at the Google® website; (3) looking in particular repositories (e.g., http://javabeginnerstutorial.com/core-java); (4) ignoring particular repositories (e.g., www.homeandlearn.co.uk/java/java.html); (5) searching the destination site (www.javabeginner.com), where the destination site is the website containing the text 401 copied and pasted into reply message 500; (6) scrolling 28% down the page to the paragraph containing the text 401 copied and pasted into reply message 500; (7) highlighting the paragraph to the term "platforms" in text 401; and (8) copying and pasting text 401 into reply message 500. Such monitored steps may be stored in database 112 in step 305 in response to detecting the copy and paste operation as described above. Such monitored steps may be attached to reply message 500 as tags or a link 501 (identified as the button labeled "source" in FIG. 5) to database 112 may be inserted in reply message 500 to retrieve the stored monitored steps thereby allowing the sender to replay the searching strategy used in answering the sender's question. In this manner, the sender will have knowledge of the searching strategy used in answering the sender's question in a more efficient manner (as opposed to having the user verbally explain his/her thought process to the sender in reaching an answer to the sender's question) which may be used to answer similar questions, such as those involving a similar topic.

In one embodiment, monitoring unit 111 may first determine if the sender of the original message (e.g., user of client device 101B) is to have access to the user's searching strategy prior to attaching the monitored steps to reply message 500 as tags or prior to inserting a link 501 to database 112 in reply message 500 to retrieve the stored monitored steps. As discussed above, the user performing the searching strategy may be able to determine who has the ability to receive the user's searching strategy in connection with answering a question in a message. For example, the user may have a profile which contains a listing of which users, whether identified by name, e-mail address, phone number or relationship (e.g., work colleague), are to have access to the user's searching strategy. In one embodiment, monitoring unit 111 may search the user's profile prior to attaching the monitored steps to reply message 500 as tags or prior to inserting link 501 to database 112 in reply message 500 to retrieve the stored monitored steps to ensure that the user authorizes the sender to receive the user's searching strategy.

After attaching the monitored steps (the steps monitored in step 303) to reply message 500 as tags or inserting link 501 to a database (e.g., database 112) in reply message 500 to retrieve the stored monitored steps, in step 307, monitoring unit 111 sends reply message 500 to the sender of the original message (e.g., user of client device 101B) containing the content answering the sender's question, where reply message 500 includes the tagged monitored steps or link 501 to database 112 to retrieve the monitored steps to obtain the searching strategy used in answering the sender's question.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing a searching strategy in connection with answering a question in a message, the method comprising:
    detecting a message being received from a sender of a client device containing a question, wherein said sender is an author of said message containing said question;
    automatically monitoring steps performed by a recipient of said message online to answer said question, wherein said steps involve search terms and selections of uniform resource locators;
    storing said monitored steps in a database in response to detecting content answering said question being inserted in a reply message responding to said message;
    automatically attaching, by a processor, said stored monitored steps to said reply message as tags or inserting a link to said database in said reply message to retrieve said stored monitored steps thereby allowing said sender to replay an online searching strategy used by said recipient to answer said question; and
    sending said reply message with said tagged monitored steps or said link to said database to retrieve said stored monitored steps to said sender.

2. The method as recited in claim 1 further comprising:
    detecting said question in said message asked by said sender, wherein said question is detected in said message using natural language processing; and
    monitoring said steps performed by said recipient of said message online to answer said question in response to detecting said question in said message asked by said sender.

3. The method as recited in claim 1 further comprising:
    attaching said stored monitored steps to said reply message in response to detecting content answering said question being inserted in said reply message responding to said message.

4. The method as recited in claim 1 further comprising:
    monitoring said steps performed by said recipient of said message online to answer said question in response to detecting said recipient performing searching activity related to a topic of said message.

5. The method as recited in claim 1 further comprising:
    storing said monitored steps in said database in response to detecting a copy and paste operation of said content into said reply message.

6. The method as recited in claim 1 further comprising:
    determining whether said sender is to have access to said recipient's online searching strategy prior to attaching said monitored steps to said reply message as tags or prior to inserting said link to said database in said reply message to retrieve said stored monitored steps.

7. The method as recited in claim 1, wherein said steps to answer said question that are monitored are performed by said recipient and other individuals forming a group of individuals.

8. A computer program product for providing a searching strategy in connection with answering a question in a message, the computer program product comprising a computer readable storage medium having program code embodied therewith, the program code comprising the programming instructions for:
    detecting a message being received from a sender of a client device containing a question, wherein said sender is an author of said message containing said question;
    automatically monitoring steps performed by a recipient of said message online to answer said question, wherein said steps involve search terms and selections of uniform resource locators;
    storing said monitored steps in a database in response to detecting content answering said question being inserted in a reply message responding to said message;
    automatically attaching said stored monitored steps to said reply message as tags or inserting a link to said database in said reply message to retrieve said stored monitored steps thereby allowing said sender to replay an online searching strategy used by said recipient to answer said question; and
    sending said reply message with said tagged monitored steps or said link to said database to retrieve said stored monitored steps to said sender.

9. The computer program product as recited in claim 8, wherein the program code further comprises the programming instructions for:
    detecting said question in said message asked by said sender, wherein said question is detected in said message using natural language processing; and
    monitoring said steps performed by said recipient of said message online to answer said question in response to detecting said question in said message asked by said sender.

10. The computer program product as recited in claim 8, wherein the program code further comprises the programming instructions for:
    attaching said stored monitored steps to said reply message in response to detecting content answering said question being inserted in said reply message responding to said message.

11. The computer program product as recited in claim 8, wherein the program code further comprises the programming instructions for:
    monitoring said steps performed by said recipient of said message online to answer said question in response to detecting said recipient performing searching activity related to a topic of said message.

12. The computer program product as recited in claim 8, wherein the program code further comprises the programming instructions for:
    storing said monitored steps in said database in response to detecting a copy and paste operation of content acquired during said monitored steps into said reply message.

13. The computer program product as recited in claim 8, wherein the program code further comprises the programming instructions for:
    determining whether said sender is to have access to said recipient's online searching strategy prior to attaching said monitored steps to said reply message as tags or prior to inserting said link to said database in said reply message to retrieve said stored monitored steps.

14. The computer program product as recited in claim 8, wherein said steps to answer said question that are monitored are performed by said recipient and other individuals forming a group of individuals.

15. A system, comprising:
a memory unit for storing a computer program for providing a searching strategy in connection with answering a question in a message; and
a processor coupled to the memory unit, wherein the processor is configured to execute the program instructions of the computer program comprising:
detecting a message being received from a sender of a client device containing a question, wherein said sender is an author of said message containing said question;
automatically monitoring steps performed by a recipient of said message online to answer said question, wherein said steps involve search terms and selections of uniform resource locators;
storing said monitored steps in a database in response to detecting content answering said question being inserted in a reply message responding to said message;
automatically attaching said stored monitored steps to said reply message as tags or inserting a link to said database in said reply message to retrieve said stored monitored steps thereby allowing said sender to replay an online searching strategy used by said recipient to answer said question; and
sending said reply message with said tagged monitored steps or said link to said database to retrieve said stored monitored steps to said sender.

16. The system as recited in claim 15, wherein the program instructions of the computer program further comprises:
detecting said question in said message asked by said sender, wherein said question is detected in said message using natural language processing; and
monitoring said steps performed by said recipient of said message online to answer said question in response to detecting said question in said message asked by said sender.

17. The system as recited in claim 15, wherein the program instructions of the computer program further comprises:
attaching said stored monitored steps to said reply message in response to detecting content answering said question being inserted in said reply message responding to said message.

18. The system as recited in claim 15, wherein the program instructions of the computer program further comprises:
monitoring said steps performed by said recipient of said message online to answer said question in response to detecting said recipient performing searching activity related to a topic of said message.

19. The system as recited in claim 15, wherein the program instructions of the computer program further comprises:
storing said monitored steps in said database in response to detecting a copy and paste operation of content acquired during said monitored steps into said reply message.

20. The system as recited in claim 15, wherein the program instructions of the computer program further comprises:
determining whether said sender is to have access to said recipient's online searching strategy prior to attaching said monitored steps to said reply message as tags or prior to inserting said link to said database in said reply message to retrieve said stored monitored steps.

* * * * *